J. P. R. James,
Clothes Pin,
Nº 68,510.    Patented Sep. 3, 1867.
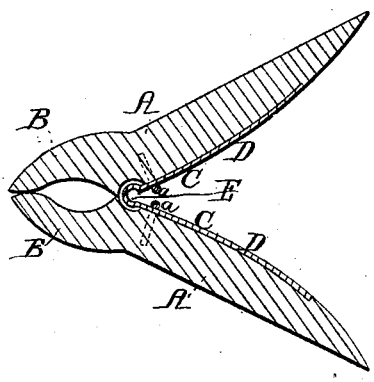
Witnesses:
Theo Tusche
Wm Trewin
Inventor;
J. P. R. James
Per Munn & Co
Attorneys

United States Patent Office.

J. P. R. JAMES, OF READ'S LANDING, MINNESOTA.

Letters Patent No. 68,510, dated September 3, 1867.

IMPROVED CLOTHES-PIN.

*The Schedule referred to in these Letters Patent and making part of the same.*

TO ALL WHOM IT MAY CONCERN:

Be it known that I, J. P. R. JAMES, of Read's Landing, in the county of Wabashaw, and State of Minnesota, have invented a new and useful Improvement in Clothes-Pins; and I do hereby declare that the following is a full, clear, and exact description thereof, which will enable those skilled in the art to make and use the same, reference being had to the accompanying drawings, forming part of this specification.

The present invention consists in a novel combination and attachment of a spring to the jaws of a clothes-pin, whereby the spring cannot become loose nor detached from the pin. In the accompanying plate of drawings my improvement in clothes-pins is illustrated, the figure being a central section through a pin in the direction of its length, made according to the present invention.

Similar letters of reference indicate corresponding parts.

A, in the drawings, represents the two arms or jaws to a clothes-pin, that by one end, B, grasp the clothes-line, and by their other are pressed upon with the hand for opening it to remove it from or place it upon a line. C, a bent or curved spring, having two arms, D, formed of a continuous piece or strip of metal, with a bow, E, at one end. By its two arms the spring C is secured in dove-tailed grooves upon the inside face to the arms D, one to each arm, where, by means of a staple, a, driven into the said arms, the spring is thereby secured.

Claim.

I claim as new, and desire to secure by Letters Patent—

The spring C, when secured to the jaws A by having its long arms D fitted in dove-tailed grooves upon the inner face of the jaws A, and held in position by means of the staples a, whereby all lateral movement of said jaw is prevented, as and for the purpose specified.

J. P. R. JAMES.

Witnesses:
 WM. B. HAINES,
 A. L. RASEY.